United States Patent
Saggar et al.

(10) Patent No.: US 12,047,920 B2
(45) Date of Patent: Jul. 23, 2024

(54) SHIFTING A FAST FOURIER TRANSFORM (FFT) WINDOW TO GENERATE A SELF-CONTAINED SLOT

(71) Applicant: QUALCOMM Incorporated, San Diego, CA (US)

(72) Inventors: Hemant Saggar, Irvine, CA (US); Iyab Issam Sakhnini, San Diego, CA (US); Raviteja Patchava, San Diego, CA (US); Morteza Soltani, San Diego, CA (US); Jun Ma, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 17/500,853

(22) Filed: Oct. 13, 2021

(65) Prior Publication Data

US 2023/0110723 A1    Apr. 13, 2023

(51) Int. Cl.
*H04L 27/26* (2006.01)
*H04L 27/28* (2006.01)
*H04W 72/0446* (2023.01)

(52) U.S. Cl.
CPC ..... *H04W 72/0446* (2013.01); *H04L 27/2627* (2013.01); *H04L 27/2636* (2013.01); *H04L 27/265* (2013.01); *H04L 27/2602* (2013.01)

(58) Field of Classification Search
CPC ........... H04W 72/0446; H04L 27/2627; H04L 27/2607; H04L 27/2602
See application file for complete search history.

(56) References Cited

U.S. PATENT DOCUMENTS

| | | | |
|---|---|---|---|
| 11,088,799 B2 | 8/2021 | Sun et al. | |
| 2008/0112518 A1* | 5/2008 | Wilhelmsson | H04L 27/2647 375/348 |
| 2017/0303163 A1* | 10/2017 | Sharma | H04L 5/0007 |
| 2020/0287679 A1* | 9/2020 | Sun | H04L 5/0048 |

OTHER PUBLICATIONS

International Search Report and Written Opinion—PCT/US2022/041101—ISA/EPO—Dec. 9, 2022.

* cited by examiner

*Primary Examiner* — Jae Y Lee
*Assistant Examiner* — Aixa A Guadalupe Cruz
(74) *Attorney, Agent, or Firm* — Seyfarth Shaw LLP

(57) ABSTRACT

A method for wireless communication at a user equipment (UE) includes receiving, from a base station, a slot parameter that configures the UE to receive a number of symbols within a self-contained slot. The method also includes receiving, from the base station, a cyclic prefix (CP) parameter associated with a single symbol of the number of symbols, the CP parameter indicating a source of samples for a CP included at a beginning of the single symbol. The method further includes receiving, from the base station, the number of symbols within the self-contained slot. In some examples, a guard interval (GI) may be included at one or both of an end or a beginning of each symbol of the number of symbols. The CP may be outside a single FFT window of a number of FFT windows, associated with the single symbol of the number of symbols.

30 Claims, 10 Drawing Sheets

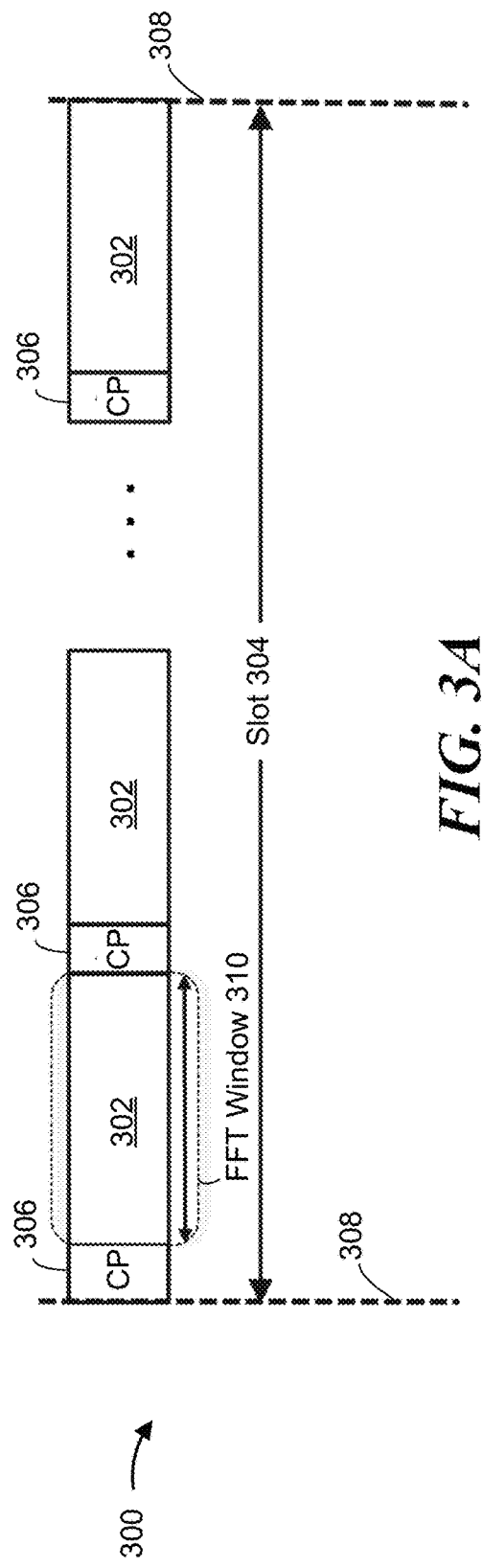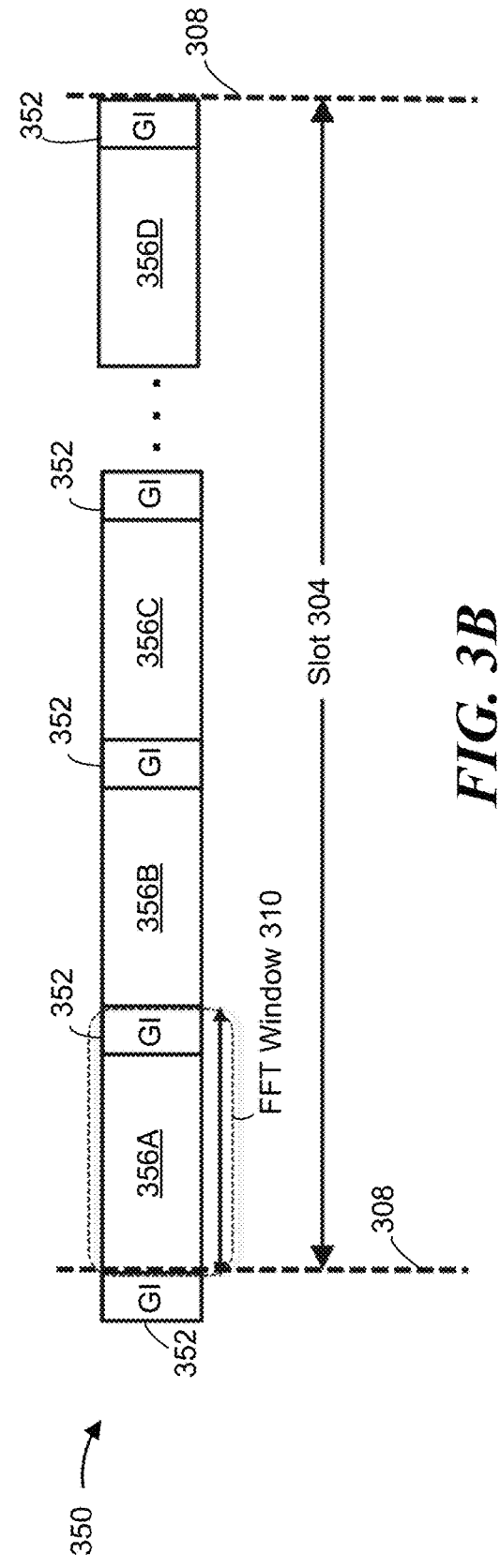
*FIG. 3A*
*FIG. 3B*

SHIFTING A FAST FOURIER TRANSFORM (FFT) WINDOW TO GENERATE A SELF-CONTAINED SLOT

FIELD OF THE DISCLOSURE

The present disclosure relates generally to wireless communications, and more specifically to shifting a fast Fourier transform (FFT) window to generate a self-contained slot associated with a guard interval (GI)-based waveform.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

Some wireless communication systems may use a single carrier waveform, such as single carrier-quadrature amplitude modulation (SC-QAM) waveform, to compliment an OFDM waveform. In some systems, the single carrier waveform may be used for higher frequency transmissions, such as transmissions within a frequency that is greater than 71 GHz. In some examples, a cyclic prefix (CP) or guard interval (GI) may be specified for each symbol transmitted within the higher frequency to enable frequency domain equalization at a receiver.

SUMMARY

In one aspect of the present disclosure, a method for wireless communication at a user equipment (UE) is disclosed. The method includes receiving, from a base station, a slot parameter that configures the UE to receive a multiple symbols within a self-contained slot. The method also includes receiving, from the base station, a cyclic prefix (CP) parameter associated with a single symbol of multiple symbols. The CP parameter may indicate a source of samples for a CP included at a beginning of the single symbol. The method further includes receiving, from the base station, the number of symbols within the self-contained slot. In some examples, a guard interval (GI) may be included at one or both of an end or a beginning of each symbol of the number of symbols, where each symbol of the multiple symbols may be associated with a respective fast Fourier transform (FFT) window of multiple FFT windows. A single FFT window, associated with the single symbol, may overlap an adjacent FFT window, associated with a symbol adjacent to the single symbol. Additionally, the CP may be outside the single FFT window.

Another aspect of the present disclosure is directed to an apparatus including means for receiving, from a base station, a slot parameter that configures the UE to receive a multiple symbols within a self-contained slot. The apparatus also includes means for receiving, from the base station, a CP parameter associated with a single symbol of multiple symbols. The CP parameter may indicate a source of samples for a CP included at a beginning of the single symbol. The apparatus further includes means for receiving, from the base station, the number of symbols within the self-contained slot. In some examples, a GI may be included at one or both of an end or a beginning of each symbol of the number of symbols, where each symbol of the multiple symbols may be associated with a respective FFT window of multiple FFT windows. A single FFT window, associated with the single symbol, may overlap an adjacent FFT window, associated with a symbol adjacent to the single symbol. Additionally, the CP may be outside the single FFT window.

In another aspect of the present disclosure, a non-transitory computer-readable medium with non-transitory program code recorded thereon is disclosed. The program code is for wireless communication by a UE. The program code is executed by a processor and includes program code to receive, from a base station, a slot parameter that configures the UE to receive a multiple symbols within a self-contained slot. The program code also includes program code to receive, from the base station, a CP parameter associated with a single symbol of multiple symbols. The CP parameter may indicate a source of samples for a CP included at a beginning of the single symbol. The program code further includes program code to receive, from the base station, the number of symbols within the self-contained slot. In some examples, a GI may be included at one or both of an end or a beginning of each symbol of the number of symbols, where each symbol of the multiple symbols may be associated with a respective FFT window of multiple FFT windows. A single FFT window, associated with the single symbol, may overlap an adjacent FFT window, associated with a symbol adjacent to the single symbol. Additionally, the CP may be outside the single FFT window.

Another aspect of the present disclosure is directed to an apparatus. The apparatus having a memory, one or more processors coupled to the memory, and instructions stored in the memory. The instructions being operable, when executed by the processor, to cause the apparatus to receive, from a base station, a slot parameter that configures the UE to receive a multiple symbols within a self-contained slot. Execution of the instructions also cause the apparatus to receive, from the base station, a CP parameter associated with a single symbol of multiple symbols. The CP parameter may indicate a source of samples for a CP included at a beginning of the single symbol. Execution of the instructions additionally cause the apparatus to receive, from the base station, the number of symbols within the self-contained slot. In some examples, a GI may be included at one or both of an end or a beginning of each symbol of the number of symbols, where each symbol of the multiple symbols may be associated with a respective FFT window of multiple FFT windows. A single FFT window, associated with the single symbol, may overlap an adjacent FFT window, associated with a symbol adjacent to the single symbol. Additionally, the CP may be outside the single FFT window.

In one aspect of the present disclosure, a method for wireless communication at a base station is disclosed. The method includes transmitting, to a UE, a slot parameter that configures the UE to receive multiple symbols within a self-contained slot. The method also includes transmitting, to the UE, a CP parameter associated with a single symbol of the multiple symbols. The CP parameter may indicate a source of samples for a CP included prior to a beginning of the single symbol. The method further includes transmitting, to the UE, the multiple symbols within the self-contained slot. In some examples, a GI may be included at one or both of an end or a beginning of each symbol of the multiple symbols, where each symbol of the multiple symbols is with a respective FFT window of multiple FFT windows at the UE. Additionally, the CP may be included prior to a beginning of the single symbol, and the CP may be outside the FFT window associated with the single symbol.

Another aspect of the present disclosure is directed to an apparatus including means for transmitting, to a UE, a slot parameter that configures the UE to receive multiple symbols within a self-contained slot. The apparatus also includes means for transmitting, to the UE, a CP parameter associated with a single symbol of the multiple symbols. The CP parameter may indicate a source of samples for a CP included prior to a beginning of the single symbol. The apparatus further includes means for transmitting, to the UE, the multiple symbols within the self-contained slot. In some examples, a GI may be included at one or both of an end or a beginning of each symbol of the multiple symbols, where each symbol of the multiple symbols is with a respective FFT window of multiple FFT windows at the UE. Additionally, the CP may be included prior to a beginning of the single symbol, and the CP may be outside the FFT window associated with the single symbol.

In another aspect of the present disclosure, a non-transitory computer-readable medium with non-transitory program code recorded thereon is disclosed. The program code is for transmit, to a UE, a slot parameter that configures the UE to receive multiple symbols within a self-contained slot. The program code is executed by a processor and includes program code to transmit, to the UE, a CP parameter associated with a single symbol of the multiple symbols. The CP parameter may indicate a source of samples for a CP included prior to a beginning of the single symbol. The program code also includes program code to transmit, to the UE, the multiple symbols within the self-contained slot. In some examples, a GI may be included at one or both of an end or a beginning of each symbol of the multiple symbols, where each symbol of the multiple symbols is with a respective FFT window of multiple FFT windows at the UE. Additionally, the CP may be included prior to a beginning of the single symbol, and the CP may be outside the FFT window associated with the single symbol.

Another aspect of the present disclosure is directed to an apparatus. The apparatus having a memory, one or more processors coupled to the memory, and instructions stored in the memory. The instructions being operable, when executed by the processor, to cause the apparatus to transmit, to a UE, a slot parameter that configures the UE to receive multiple symbols within a self-contained slot. Execution of the instructions also cause the apparatus to transmit, to the UE, a CP parameter associated with a single symbol of the multiple symbols. The CP parameter may indicate a source of samples for a CP included prior to a beginning of the single symbol. Execution of the instructions additionally cause the apparatus to transmit, to the UE, the multiple symbols within the self-contained slot. In some examples, a GI may be included at one or both of an end or a beginning of each symbol of the multiple symbols, where each symbol of the multiple symbols is with a respective FFT window of multiple FFT windows at the UE. Additionally, the CP may be included prior to a beginning of the single symbol, and the CP may be outside the FFT window associated with the single symbol.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 3A is a block diagram illustrating an example of a cyclic prefix (CP)-based waveform.

FIG. 3B is a block diagram illustrating an example of a guard interval (GI)-based waveform.

DETAILED DESCRIPTION

Figure 1:
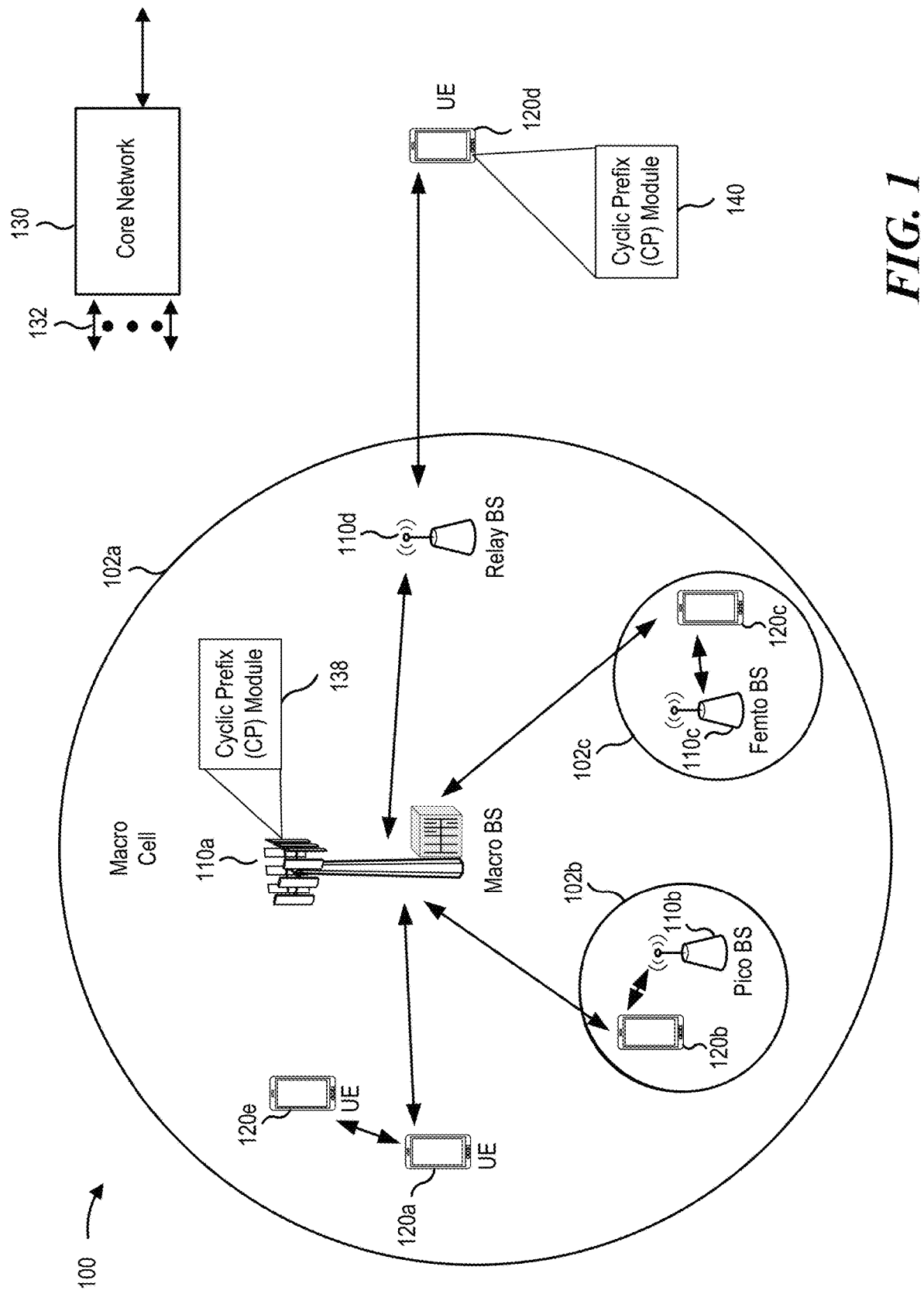
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Some wireless communication systems may use a single carrier waveform, such as single carrier-quadrature amplitude modulation (SC-QAM) waveform, to compliment an orthogonal frequency division multiplexing (OFDM) waveform. In some examples, the single carrier waveform may be used for higher frequency transmissions, such as transmissions within a frequency that is greater than 71 GHz. In some such examples, a slot may be transmitted according to a cyclic prefix (CP)-based waveform or a guard interval (GI)-based waveform to enable frequency domain equalization at a receiver.

Each symbol of a slot transmitted according to the CP-based waveform may be associated with a CP that is outside a fast Fourier transform (FFT) window and an inverse-FFT (IFFT) window associated with the symbol. Each symbol of a slot associated with a GI-based waveform may include a GI at one or both of a beginning or an end of the symbol. Each GI may be within an FFT/IFFT window of a corresponding symbol. A slot transmitted according to a GI-based waveform may adapt to different delay spread scenarios by adjusting a size of one or more GIs in the slot while maintaining a size of each symbol associated with a respective GI of the one or more GIs. The size of each symbol may be maintained by adjusting a size of the length of a data portion in the FFT window associated with the symbol. In the CP-based waveform, on the other hand, adjusting a CP length may result in adjusted symbol lengths, and potentially adjusted slot boundaries.

In contrast to a CP, a GI may include known information that is independent of data transmitted in an associated symbol. Therefore, in addition to creating a cyclic convolution between the channel and the transmitted signal, at the receiver, the GI may be used for other channel-related purposes, such as, channel estimation, phase tracking, or noise estimation.

Some communication systems may use the GI-based waveform based on the flexibility provided by the GI. In such communication systems, each symbol of a slot associated with a GI-based waveform may include a GI at one or both of a beginning or an end of the symbol. In such examples, the GI associated with one symbol may serve as a CP for an adjacent symbol. In some such examples, the GI that serves as the CP for an initial symbol of a current slot may be located at an end of a symbol within a prior adjacent slot. In such examples, the GI may be used to decode the initial symbol, such that the current slot is dependent on the prior adjacent slot. In some such examples, a user equipment (UE) may not receive a GI in a last symbol of the prior adjacent slot if the prior adjacent slot is an uplink (UL) slot. The failure to receive the GI in the last symbol of the prior adjacent slot may result in a decoding error for the initial symbol of the current slot. In other such examples, the prior adjacent slot and the current slot may use different beamformers or precoders, thereby causing a decoding error for the initial symbol of the current slot based on the initial symbol being dependent on the GI in the last symbol of the prior adjacent slot.

Aspects of the present disclosure are directed to creating a self-contained GI-based slot by shifting an FFT window associated with a single symbol of multiple symbols within the slot, such that a CP may be added at a beginning of the single symbol based on the shifted FFT window. In some examples, the single symbol may be an initial symbol within the slot. In other examples, the single symbol may be any one of the multiple symbols within the slot. In some examples, a base station may transmit, to a UE, a slot parameter that configures the UE to receive multiple symbols within the self-contained slot. The UE may associate each symbol with an FFT window, such that the UE may decode each received symbol during a respective FFT window. The base station may also transmit a CP parameter associated with the single symbol of the multiple symbols. The CP parameter may indicate a source of samples for a CP to be included at a beginning of the single symbol. Based on the slot parameter and the CP parameter, the UE may shift the FFT window associated with the single symbol to accommodate the addition of the CP, such that the CP falls outside the boundaries of the shifted FFT window. In some examples, the shifted FFT window overlaps an adjacent symbol and an FFT window associated with the adjacent symbol. In other examples, the base station shifts a transmission window and reduces a length of the adjacent symbol. After transmitting the slot parameter and the CP parameter, the base station may then transmit the multiple symbols, to the UE, within the self-contained slot. The base station may include a GI at one or both of an end or a beginning of each symbol of the multiple symbols. The base station includes the CP at the beginning of the single symbol.

Particular aspects of the subject matter described in this disclosure can be implemented to realize one or more of the following potential advantages. In some examples, the described techniques may remove a dependency between successive slots by creating a self-contained slot for transmissions associated with a GI-based waveform. In some such examples, removing the dependency between successive slots may prevent decoding errors caused by an uplink/downlink configuration mismatch between a downlink (DL) slot associated with a GI-based waveform and a prior adjacent UL slot. In other such examples, removing the dependency between successive slots may prevent decoding errors caused based on mismatch between beamformers or precoders used for successive slots. Additionally, the use of the self-contained slot may improve power saving at the UE because the UE is no longer required to remain awake to receive a symbol within a previous slot.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B, an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, for example, macro BSs, pico BSs, femto BSs, relay BSs, and/or the like. These different types of BSs may have different transmit power levels, different coverage areas, and different impact on interference in the wireless network 100. For example, macro BSs may have a high transmit power level (for example, 5 to 40 Watts) whereas pico BSs, femto BSs, and relay BSs may have lower transmit power levels (for example, 0.1 to 2 Watts).

As an example, the BSs 110 (shown as BS 110a, BS 110b, BS 110c, and BS 110d) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120*a*, 120*b*, 120*c*) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a CP module 140. For brevity, only one UE 120*d* is shown as including the CP module 140. The CP module 140 may receive, from a base station, a slot parameter that configures the UE to receive a multiple symbols within a self-contained slot; receive, from the base station, a CP parameter associated with a single symbol of multiple symbols; and receive, from the base station, the number of symbols within the self-contained slot.

The core network 130 or the base stations 110 may include a CP module 138. For brevity, only one base station 110 is shown as including the CP module 138. The CP module 138 may transmit, to a UE, a slot parameter that configures the UE to receive multiple symbols within a self-contained slot; transmit, to the UE, a CP parameter associated with a single symbol of the multiple symbol; and transmit, to the UE, the multiple symbols within the self-contained slot Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (for example, remote device), or some other entity. A wireless node may provide, for example, connectivity for or to a network (for example, a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

Figure 2:
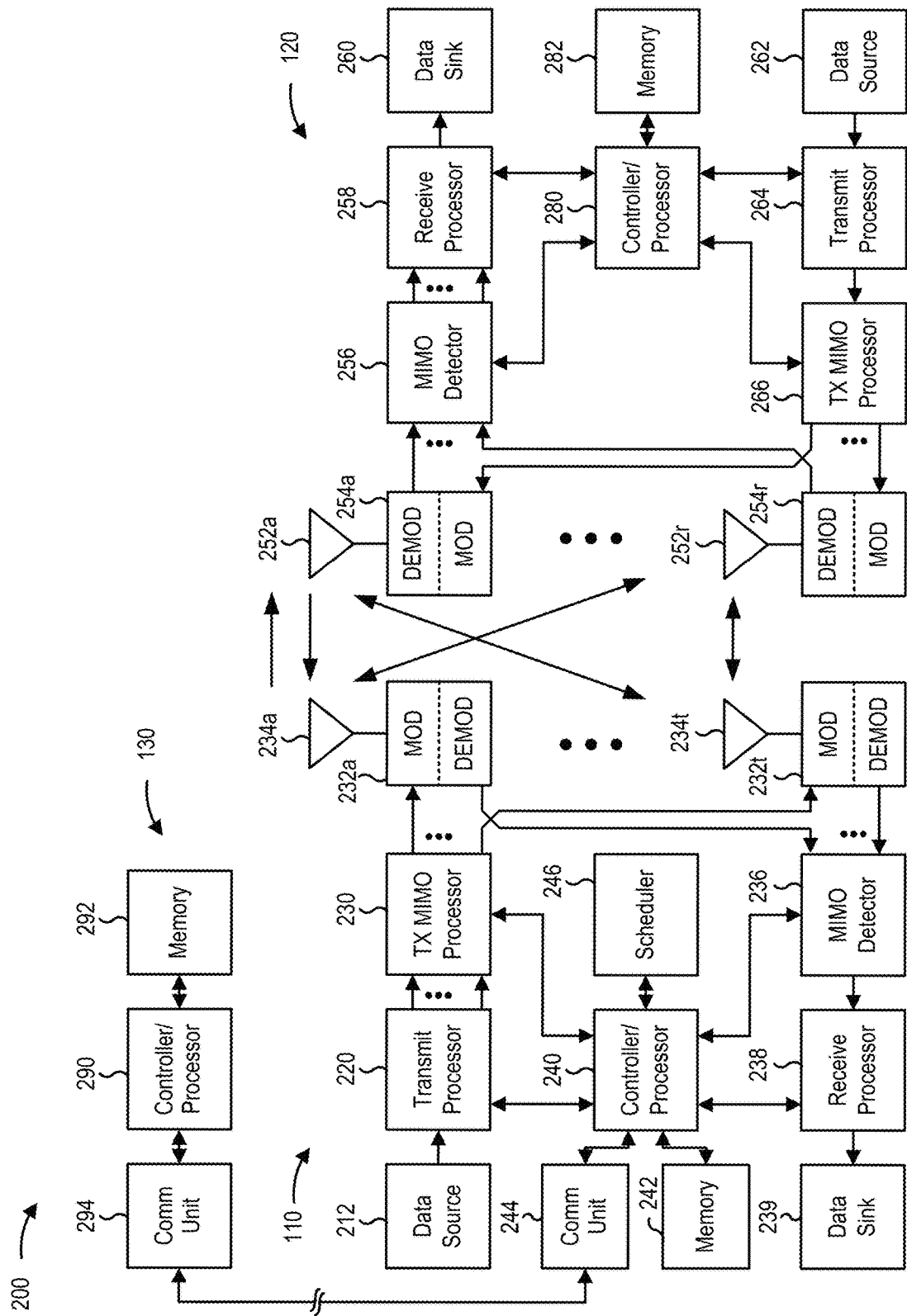
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (for example, for OFDM and/or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 280, and a memory 282.

The controller/processor 240 of the base station 110, the controller/processor 280 of the UE 120, and/or any other component(s) of FIG. 2 may perform one or more techniques associated with transmitting or receiving multiple symbols within a self-contained slot as described in more detail elsewhere. For example, the controller/processor 240 of the base station 110, the controller/processor 280 of the UE 120, and/or any other component(s) of FIG. 2 may perform or direct operations of, for example, the processes of FIGS. 8 and 10 and/or other processes as described. Memories 242 and 282 may store data and program codes for the base station 110 and UE 120, respectively. A scheduler 246 may schedule UEs for data transmission on the downlink and/or uplink.

Some wireless communication systems may use a single carrier waveform, such as single carrier-quadrature amplitude modulation (SC-QAM) waveform, to compliment an OFDM waveform. In some systems, the single carrier waveform may be used for higher frequency transmissions, such as transmissions within a frequency that is greater than 71 GHz. In some examples, a CP or GI may be specified for each symbol transmitted within the higher frequency to enable a cyclic convolution operation of the transmitted signal with the wireless channel impulse response and as a result allow simple frequency domain equalization at a receiver. In some such examples, a cyclic prefix (CP) may be created by adding the last K samples of a symbol to the beginning of the symbol. The samples for the CP may be data samples.

As previously discussed, the GI-based waveform may provide greater flexibility in comparison to the CP-based waveform. In some examples, the GI-based waveform may adapt to different delay spread scenarios by adjusting a size of one or more GIs in the slot while maintaining a size of each symbol associated with a respective GI of the one or more GIs. In other examples, a GI may include known information that is independent of data transmitted in an associated symbol. Therefore, in addition to creating a cyclic convolution between the channel and the transmitted signal, at the receiver, the GI may be used for other channel-related purposes, such as, channel estimation, phase tracking, or noise estimation. Communication systems that use the GI-based waveform may add an independent block of GI samples at the end or beginning of each symbol within a slot. The GI samples are not limited to data samples. Rather, the GI samples may be selected based on a desired benefit, such as increasing a number of reference signals or reducing a peak-to-average power ratio (PAPR). In some examples, the GI may be added at the beginning. In some other examples, the GI may be added at the beginning and the end to achieve a desired performance criterion.

Some wireless communication systems may use a CP-based waveform or a GI-based waveform. FIG. 3A is a block diagram illustrating an example 300 of a slot associated with a CP-based waveform. As shown in FIG. 3A, multiple symbols 302 may be transmitted within a slot 304. In this example, a respective CP 306 associated with each symbol 302 may be within a slot boundary 308. Still, each CP 306 may be outside an FFT window 310. Each symbol 302 may be associated with an FFT window 310. In the example of FIG. 3A, each CP 306 may have a different length. The slot 304 of FIG. 3A may be an example of a self-contained slot. Additionally, the slot 304 associated with the CP-based waveform may include fourteen or twelve symbols per slot. In contrast to the CP-based waveform, a GI associated with a symbol within a slot may fall outside a slot boundary.

FIG. 3B is a block diagram illustrating an example 350 of a GI-based waveform. As shown in FIG. 3B, multiple symbols 356A, 356B, 356C, and 356D may be transmitted within the slot 304. Each symbol 356A, 356B, 356C, and 356D may include a GI 352. The GI 352 associated with one symbol 356A, 356B, 356C, and 356D may be used as a CP for a successive symbol. For example, the GI 352 associated with the first symbol 356A may be used as a CP for the second symbol 356B. As shown in FIG. 3B, one GI 352 may be outside the slot boundary 308. This GI 352 may be used as a CP for the first symbol 356A. Therefore, in the example of FIG. 3B, the slot 304 may be dependent on a previous slot (not shown in FIG. 3B) based on the GI 352 being outside the slot boundary 308. Each symbol 356A, 356B, 356C, and 356D may be associated with an FFT window 310. Additionally, each GI 352 may be within a respective FFT window 310 of an associated symbol 356A, 356B, 356C, and 356D. Furthermore, each GI 352 may have the same length or different lengths. The slot 304 of FIG. 3B may be an example of a non-self-contained slot. Additionally, the slot 304 associated with the GI-based waveform may include fifteen symbols per slot.

A channel convolution may become cyclic based on an addition of a CP or a GI to each symbol within a slot. The CP associated with each symbol may be derived from data samples. In contrast, GI samples may be obtained from data samples, reference signal samples, or other types of samples based on a need of a corresponding wireless communication system. In some examples, GI samples may be obtained from a reference signal to increase a number of reference signals. The additional reference signal samples may aid in important tasks such as channel estimation, phase noise estimation, and phase tracking. In other examples, certain GI samples may be used to reduce a PAPR of the time-domain symbol. Aspects of the present disclosure are directed to slots associated with a GI-based waveform. As discussed with reference to FIG. 3B, a conventional slot associated with the GI-based waveform may be dependent on a previous adjacent slot because the slot is not self-contained. In some examples, based on a UL/DL configuration, a previous adjacent slot may be an uplink slot. In such examples, a current downlink slot may be barred from using the GI-based waveform due to the mismatch between the UL configuration of the previous adjacent slot and the DL configuration of the current slot. Specifically, a first symbol of the current slot may fail to decode because the GI used to decode the current slot at a UE would be within a UL slot associated with a transmission from the UE. In some other examples, the first symbol of the current slot may fail to decode because different beamformers or precoders may be used for the previous adjacent slot and the current slot. Therefore, it may be desirable to mitigate the dependency between successive slots, such that slots associated with a GI-based waveform may be self-contained.

Figure 4:
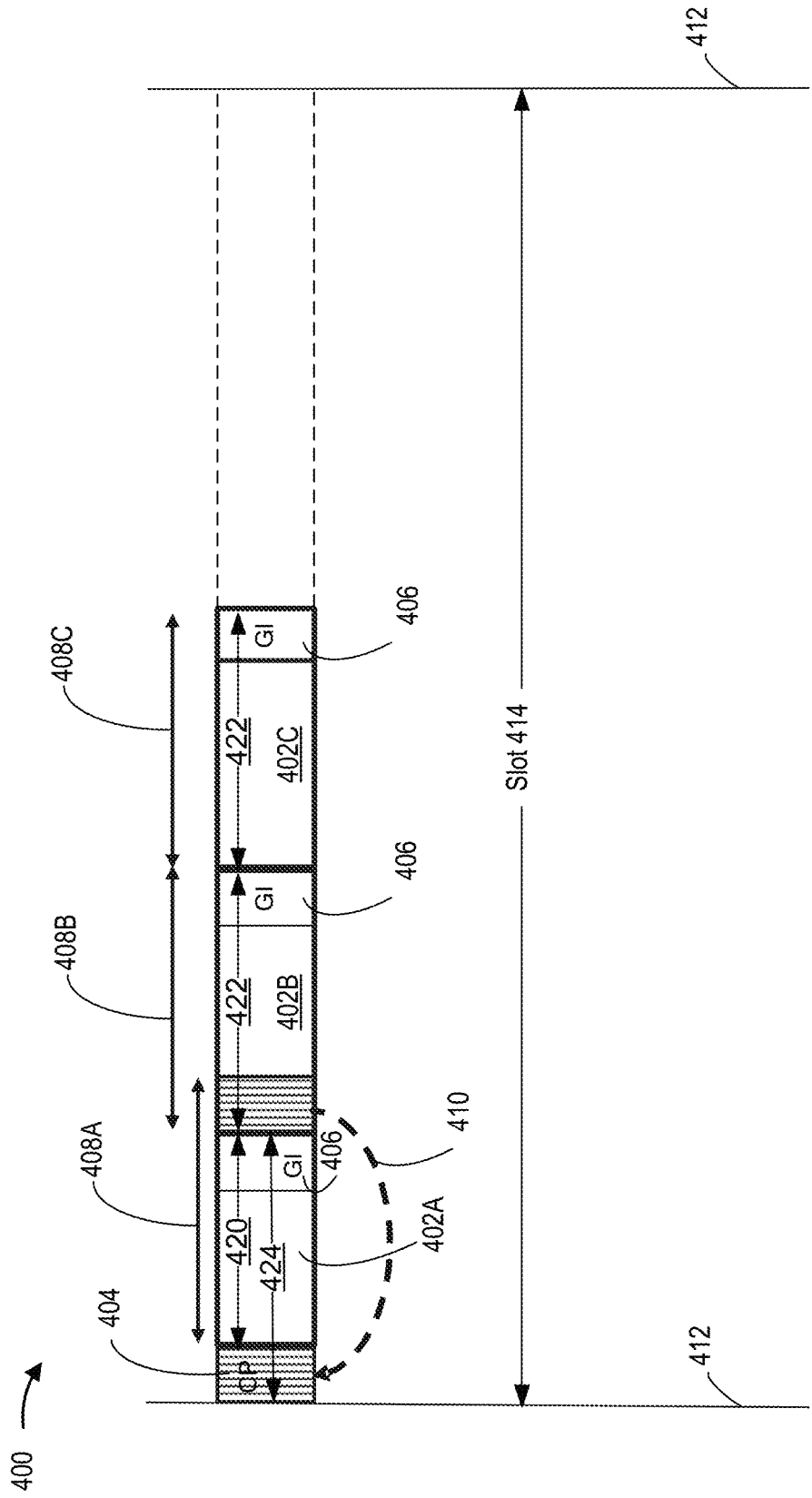
FIGS. 4, 5, and 6 are block diagrams illustrating examples of a fast Fourier transform (FFT)-window shift, in accordance with aspects of the present disclosure.

Aspects of the present disclosure are directed to creating a self-contained slot by shifting an FFT window associated with a single symbol of multiple symbols within a slot. In such aspects, a CP may be included in the single symbol based on the shifted FFT window. FIG. 4 is a block diagram illustrating an example 400 of an FFT-window shift, in accordance with aspects of the present disclosure. Although not expressly shown in the example 400 of FIG. 4, a base station, such as the base station 110 described with reference to FIGS. 1 and 2, may transmit a slot parameter to a UE, where the slot parameter configures the UE to receive multiple symbols 402A, 402B, and 402C within a self-contained slot 414. The UE may be an example of a UE 120 described with reference to FIGS. 1 and 2. As shown in the example 400 of FIG. 4, the slot 414 may be defined by slot boundaries 412. Additionally, each symbol 402A, 402B, and 402C may be associated with an FFT window 408A, 408B, and 408C. For ease of explanation, the slot 414 is shown with three symbols 402A, 402B, and 402C. Additional symbols may be included within the slot 414.

Additionally, although not shown in the example 400 of FIG. 4, the base station may also transmit, to the UE, a CP parameter associated with a single symbol 402A of the multiple symbols 402A, 402B, and 402C. The CP parameter may indicate a source of samples for a CP 404 included at a beginning of the single symbol 402A. As shown in FIG. 4, the first symbol 402A includes the CP 404. As discussed, the CP 404 is outside the FFT window 408A associated with the first symbol 402A. Aspects of the present disclosure are not limited to including the CP 404 at the beginning of a particular symbol within the slot 414. The CP 404 may be included at the beginning of any one of the symbols 402A, 402B, and 402C within the slot 414.

Additionally, in the example 400 of FIG. 4, the base station transmits the symbols 402A, 402B, and 402C to the UE within the self-contained slot 414. As shown in FIG. 4, each symbol 402A, 402B, and 402C includes a GI 406. As shown in the example 400 of FIG. 4, the GI 406 is at the end of each symbol 402A, 402B, and 402C. In some other examples, the GI 406 may be at one or both of a beginning or the end of each symbol 402A, 402B, and 402C.

In some aspects, as shown in the example 400 of FIG. 4, the first FFT window 408A associated with the first symbol 402A that includes the CP 404 may be shifted based on a length of the CP 404, such that the first FFT window 408A overlaps an adjacent FFT window 408B based on the shift. In some implementations, samples of a second symbol 402B may be used as a source for the CP 404. As shown in FIG. 4, the second symbol 402B is adjacent to the first symbol 402A. In this example, the samples (shown as a vertical line pattern) may be obtained from the beginning of the second symbol 402B and copied (shown via a dashed arrow 410) before a beginning of the first symbol 402A. The beginning of the first symbol 402A may be defined based on a border of the first FFT window 408A associated with the first symbol 402A, such that the CP 404 falls outside the border of the first FFT window 408A. In such implementations, the first FFT window 408A may be shifted based on a length of the CP 404, where the length of the CP 404 may be based on a number of samples used to generate the CP 404. Based on the shift, the first FFT window 408A may overlap the second symbol 402B and the second FFT window 408B associated with the second symbol 402B. Additionally, based on the shift of the first FFT window 408A, a length 420 of the first symbol 402A associated with the first FFT window 408A may be reduced to accommodate the CP 404, such that the length 420 of the first symbol 402A is less than a length 422 of the other symbols 402B and 402C. The length of the CP 404 is excluded from the length 420 of the first symbol 402A. Still, a total length 424 of the first symbol 402A, based on a combination of the length 420 of the first symbol 402A and the length of the CP 404, may be the same as the length 422 of the other symbols 402B and 402C. By adding the CP 404 before the start of the first symbol 402A, a linear convolution of each symbol 402A, 402B, and 402C with the channel impulse response may become circular based on the presence of each GI 406.

As discussed, in some implementations, samples of one symbol, such as the second symbol 402B, may be used to generate the CP 404 defined before the start of another symbol, such as the first symbol 402A. In some examples, the first symbol 402A may be a reference signal, such as a demodulation reference signal (DMRS), and the second symbol 402B may include another reference signal, such as a DMRS. In other examples, the first symbol 402A may include data and the second symbol 402B may include a reference signal or data. In some examples in which the first symbol 402A includes a reference signal, the UE is expected to be aware of the content of the reference signal prior to receiving the reference signal. Based on this expectation, the reference signal may be limited to including information that is known, to the UE, apriori. Thus, in such examples, where the CP samples of the first symbol are copied from the second symbol, the second symbol 402B may not include data if the first symbol 402A includes a reference signal, since such data samples are not expected to be known, to the UE, apriori.

Figure 5:
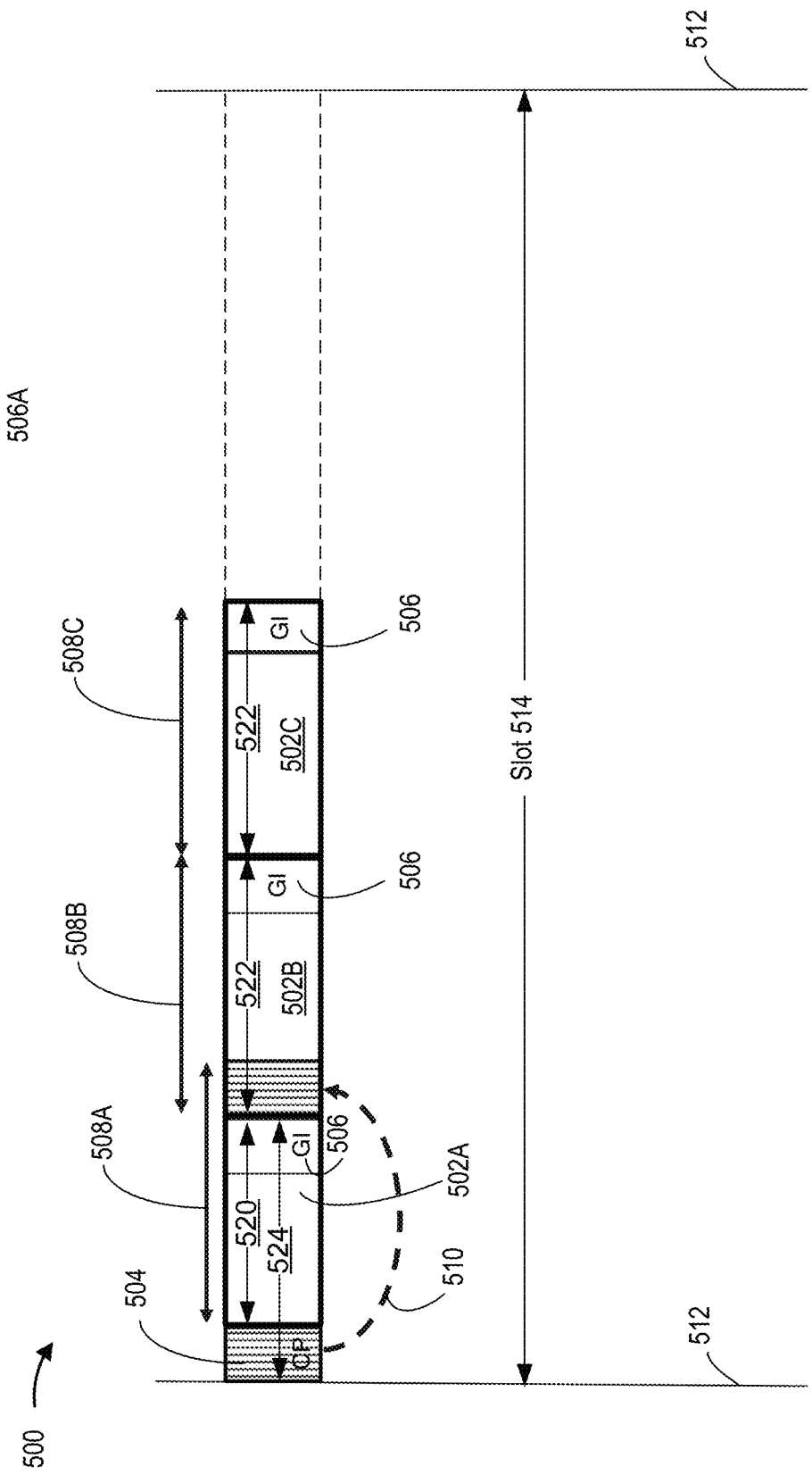

In some other examples, instead of copying samples from an adjacent symbol, the samples for the CP may be obtained from the current symbol itself and copied from the current symbol to the adjacent symbol. In such examples, the current symbol is able to include a reference signal and the adjacent symbol is able to include data. To illustrate, FIG. 5 is a block diagram illustrating an example 500 of an FFT-window shift, in accordance with aspects of the present disclosure. Although not expressly shown in the example 500 of FIG. 5, a base station, such as the base station 110 described with reference to FIGS. 1 and 2, may transmit a slot parameter to a UE, where the slot parameter configures the UE to receive multiple symbols 502A, 502B, and 502C within a self-contained slot 514. The UE may be an example of a UE 120 described with reference to FIGS. 1 and 2. As shown in the example 500 of FIG. 5, the slot 514 may be defined by slot boundaries 512. Additionally, each symbol 502A, 502B, and 502C may be associated with an FFT window 508A, 508B, and 508C. For ease of explanation, the slot 514 is shown with three symbols 502A, 502B, and 502C. Additional symbols may be included within the slot 514.

Additionally, although not shown in the example 500 of FIG. 5, the base station may also transmit, to the UE, a CP parameter associated with a single symbol 502A of the multiple symbols 502A, 502B, and 502C. The CP parameter may indicate a source of samples for a CP 504 included at a beginning of the single symbol 502A. As shown in FIG. 5, the first symbol 502A includes the CP 504. As discussed, the CP 504 is outside the FFT window 508A associated with the first symbol 502A. Aspects of the present disclosure are not limited to including the CP 504 at the beginning of a particular symbol within the slot 514. The CP 504 may be included at the beginning of any one of the symbols 502A, 502B, and 502C within the slot 514.

Additionally, in the example 500 of FIG. 5, the base station transmits the symbols 502A, 502B, and 502C to the UE within the self-contained slot 514. As shown in FIG. 5, each symbol 502A, 502B, and 502C includes a GI 506. As shown in the example 500 of FIG. 5, the GI 506 is at the end of each symbol 502A, 502B, and 502C. In some other examples, the GI 506 may be at one or both of a beginning or the end of each symbol 502A, 502B, and 502C.

In some aspects, as shown in the example 500 of FIG. 5, the first FFT window 508A associated with the first symbol 502A that includes the CP 504 may be shifted based on a length of the CP 504, such that the first FFT window 508A overlaps an adjacent FFT window 508B based on the shift. In some implementations, samples (shown as a vertical line pattern) of the first symbol 502A may be used as a source for the CP 504. As shown in FIG. 5, the samples at the beginning of the first symbol 502A may be designated as the CP 504, such that the CP 504 falls outside the border of the first FFT window 508A. Additionally, the samples may be copied (shown via a dashed arrow 510) and placed at the beginning of a second symbol 502B that is adjacent to the first symbol 502A. The beginning of the second symbol 502B may be defined based on a border of the second FFT window 508B associated with the second symbol 502B. In such implementations, the first FFT window 508A may be shifted based on a length of the CP 504, where the length of the CP 504 may be based on a number of samples used to generate the CP 504. Based on the shift, the first FFT window 508A may overlap the second symbol 502B and the second FFT window 508B associated with the second symbol 502B. Additionally, based on the shift of the first FFT window 508A, a length 520 of the first symbol 502A associated with the first FFT window 508A may be reduced to accommodate the CP 504, such that the length 520 of the first symbol 502A is less than a length 522 of the other symbol 502B and 502C. The length of the CP 504 is excluded from the length of the first symbol 502A. Still, a total length 524 associated with the first symbol 502A, based on a combination of the length of the CP 504 and the length 520 of the first symbol 502A, may be the same as the length 522 of the other symbol 502B and 502C. By adding the CP 504 before the start of the first symbol 502A, a linear convolution of each symbol 502A, 502B, and 502C with the impulse response of the channel may become circular based on the presence of each GI 506.

As discussed, in some implementations, samples of one symbol, such as the second symbol 502B, may be used to generate the CP 504 defined before the start of another symbol, such as the first symbol 502A. In some examples, the first symbol 502A may be a reference signal, such as a DMRS, and the second symbol 502B may include data or a reference signal. In other examples, the first symbol 502A may include data and the second symbol 502B may include data. As discussed, a reference signal may include only known data. Therefore, in the example 500 of FIG. 5, the first symbol 502A may not include data if the second symbol 502B includes a reference signal.

Figure 6:
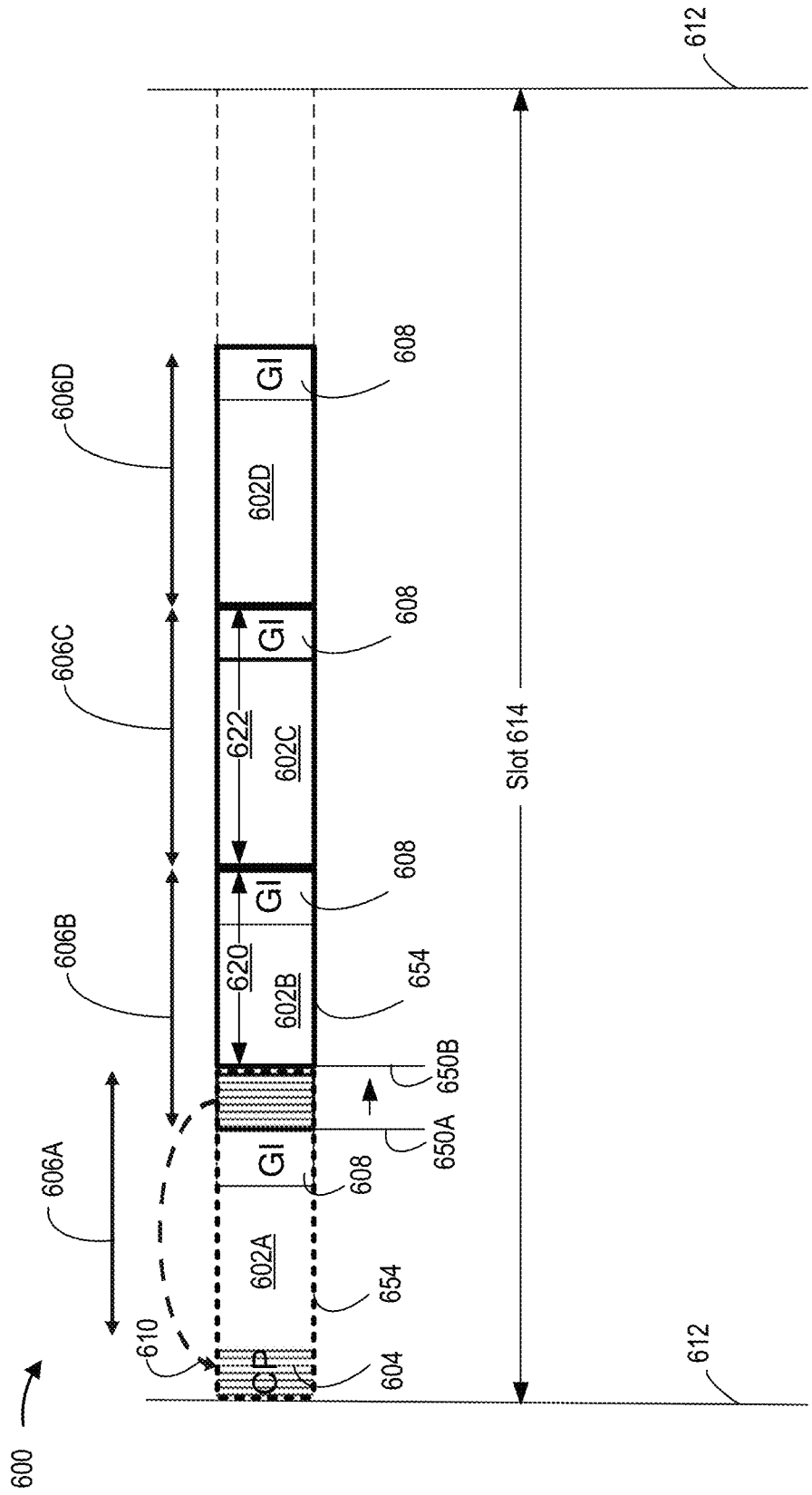

In still some other examples, transmitter operations may be performed symbol by symbol. In such examples, the samples for the CP may be obtained from the current symbol itself and copied from the current symbol based on a transmitter shifting a transmission window, such that dependencies between adjacent symbols are removed at the transmitter. To illustrate, FIG. 6 is a block diagram illustrating an example 600 of an FFT-window shift, in accordance with aspects of the present disclosure. Although not expressly shown in the example 600 of FIG. 6, a base station, such as the base station 110 described with reference to FIGS. 1 and 2, may transmit a slot parameter to a UE, where the slot parameter configures the UE to receive multiple symbols 602A, 602B, 602C, and 602D within a self-contained slot 614. The UE may be an example of a UE 120 described with reference to FIGS. 1 and 2. As shown in the example 600 of FIG. 6, the slot 614 may be defined by slot boundaries 612. Additionally, each symbol 602A, 602B, 602C, and 602D may be associated with an FFT window 608A, 608B, 608C, and 608D. For ease of explanation, the slot 614 is shown with four symbols 602A, 602B, 602C, and 602D. Additional symbols may be included within the slot 614.

Additionally, although not shown in the example 600 of FIG. 6, the base station may also transmit, to the UE, a CP parameter associated with a single symbol 602A of the multiple symbols 602A, 602B, 602C, and 602D. The CP parameter may indicate a source of samples for a CP 604 included at a beginning of the single symbol 602A. As shown in FIG. 6, the first symbol 602A includes the CP 604. As discussed, the CP 604 is outside the FFT window 604A associated with the first symbol 602A. Aspects of the present disclosure are not limited to including the CP 604 at the beginning of a particular symbol within the slot 614. The CP 604 may be included at the beginning of any one of the symbols 602A, 602B, 602C, and 602D within the slot 614.

Additionally, in the example 600 of FIG. 6, the base station transmits the symbols 602A, 602B, 602C, and 602D to the UE within the self-contained slot 614. As shown in FIG. 6, each symbol 602A, 602B, 602C, and 602D includes a GI 606. As shown in the example 600 of FIG. 6, the GI 606 is at the end of each symbol 602A, 602B, 602C, and 602D. In some other examples, the GI 606 may be at one or both of a beginning or the end of each symbol 602A, 602B, 602C, and 602D.

In some aspects, as shown in the example 600 of FIG. 6, to prevent a dependency between the first symbol 602A and the second symbol 602B, the base station may shift a transmission boundary between a transmission window 654 of the first symbol 602A and a transmission window 654 of the second symbol 602B based on a length of the GI 608. The transmission boundary may be shifted from a first boundary location 650A to a second boundary location 650B. The shifted transmission boundary increases a length of the transmission window 654 of the first symbol 602A and decreases the length 620 of the second symbol 602B. In the example 600 of FIG. 6, the samples between the first boundary location 650A and the second boundary location 650B are transmitted as part of the first symbol 602A, unlike previous examples 400 and 500 shown in FIGS. 4 and 5, respectively, where the samples are transmitted as part of the second symbol 402B and 502B. In the example 600 of FIG. 6, the samples at the end of the first symbol 602A may be designated as the CP 604, such that the CP 604 falls outside the border of the first FFT window 608A. Additionally, the samples may be copied (shown via a dashed arrow 610) from the end of the first symbol 602A and placed at the beginning of the first symbol 602A. In the example 600 of FIG. 6, although the base station may shift the transmission boundary to the second location 650B, the FFT windows 608A, 608B, 606C, and 606D are not shifted. Therefore, a receiver, such as a UE, may be agnostic to the shifted transmission boundary, such that receive boundary between the first symbol 602A and the second symbol 602B may remain at the first boundary location 650A.

By adding the CP 604 at the start of the first symbol 602A, a linear convolution of each symbol 602A, 602B, and 602C may be circular based on the presence of each GI 606. As discussed, in some implementations, samples of one symbol, such as the first symbol 602A, may be used to generate the CP 604 defined before the start of the symbol, such as the first symbol 602A. As previously discussed, the UE is expected to be aware of the content of the reference signal prior to receiving the reference signal. Based on this expectation, the reference signal may be limited to including information that is known, to the UE, apriori. Thus, in the example 600 of FIG. 6, the first symbol 602A may not include data if the second symbol 602B includes a reference signal, since such data samples are not expected to be known, to the UE, apriori. Therefore, in the example 600 of FIG. 6, the first symbol 602A may include a reference signal, such as a DMRS, and the second symbol 602B may include data or a reference signal.

Figure 7:
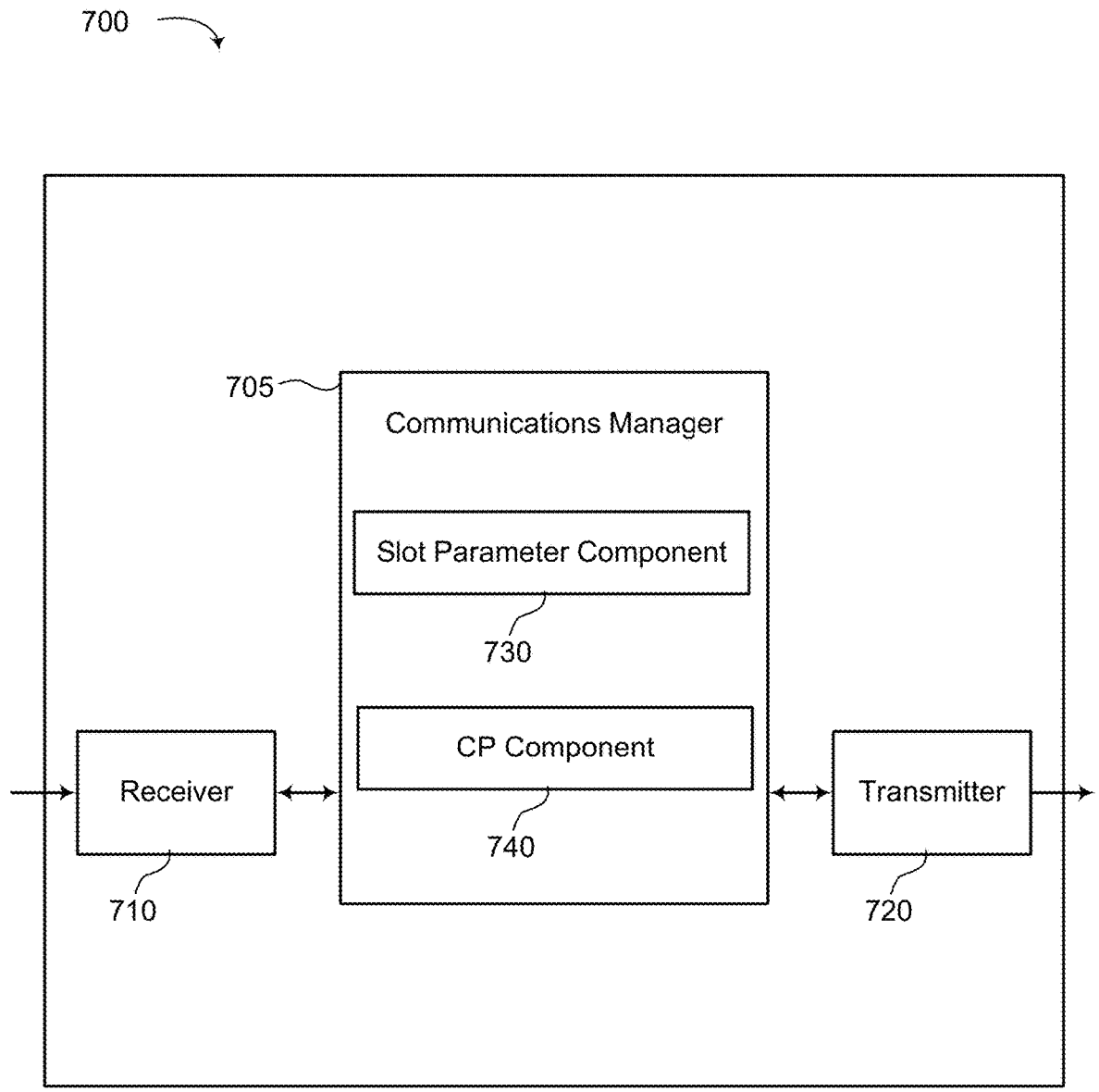
FIG. 7 is a block diagram illustrating an example of a wireless communication device that supports receiving multiple symbols in a self-contained slot, in accordance with aspects of the present disclosure.

FIG. 7 is a block diagram illustrating an example of a wireless communication device 700 that supports shifting an FFT-window, in accordance with aspects of the present disclosure. The device 700 may be an example of aspects of a UE 120 described with reference to FIG. 1. The wireless communication device 700 may include a receiver 710, a communications manager 705, a transmitter 720, a slot parameter component 730, and a CP component 740, which may be in communication with one another (for example, via one or more buses). In some examples, the wireless communication device 700 is configured to perform operations, including operations of the process 800 described below with reference to FIG. 8.

In some examples, the wireless communication device 700 can include a chip, chipset, package, or device that includes at least one processor and at least one modem (for example, a 5G modem or other cellular modem). In some examples, the communications manager 705, or its sub-components, may be separate and distinct components. In some examples, at least some components of the communications manager 705 are implemented at least in part as software stored in a memory. For example, portions of one or more of the components of the communications manager 705 can be implemented as non-transitory code executable by the processor to perform the functions or operations of the respective component.

The receiver 710 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a physical downlink control channel (PDCCH)) and data channels (for example, a physical downlink shared channel (PDSCH)). The other wireless communication devices may include, but are not limited to, a base station 110 described with reference to FIG. 1.

The received information may be passed on to other components of the device 700. The receiver 710 may be an example of aspects of the receive processor 258 described with reference to FIG. 2. The receiver 710 may include a set of radio frequency (RF) chains that are coupled with or otherwise utilize a set of antennas (for example, the set of antennas may be an example of aspects of the antennas 252a through 252r described with reference to FIG. 2).

The transmitter 720 may transmit signals generated by the communications manager 705 or other components of the wireless communication device 700. In some examples, the transmitter 720 may be collocated with the receiver 710 in a transceiver. The transmitter 720 may be an example of aspects of the transmit processor 274 described with reference to FIG. 2. The transmitter 720 may be coupled with or otherwise utilize a set of antennas (for example, the set of antennas may be an example of aspects of the antennas 252a through 252r described with reference to FIG. 2), which may be antenna elements shared with the receiver 710. In some examples, the transmitter 720 is configured to transmit control information in a physical uplink control channel (PUCCH) and data in a physical uplink shared channel (PUSCH).

The communications manager 705 may be an example of aspects of the controller/processor 280 described with reference to FIG. 2. The communications manager 705 may include a slot parameter component 730 and a CP component 740. In some implementations, working in conjunction with the receiver 710, the slot parameter component 730 may receive, from a base station, a slot parameter that configures the UE to receive a multiple symbols within a self-contained slot. Additionally, working in conjunction with one or both of the receiver 710 and the slot parameter component 730, the CP component 740 may receive, from the base station, a CP parameter associated with a single symbol of multiple symbols. The CP parameter may indicate a source of samples for a CP included at a beginning of the single symbol. Furthermore, working in receives, from the base station, a CP parameter associated with a single symbol of multiple symbols. The CP parameter may indicate a source of samples for a CP included at a beginning of the single symbol receives, from the base station, the number of symbols within the self-contained slot. In some examples, a GI may be included at one or both of an end or a beginning of each symbol of the number of symbols, where each symbol of the multiple symbols may be associated with a respective FFT window of multiple FFT windows. A single FFT window, associated with the single symbol, may overlap an adjacent FFT window, associated with a symbol adjacent to the single symbol. Additionally, the CP may be outside the single FFT window.

Figure 8:
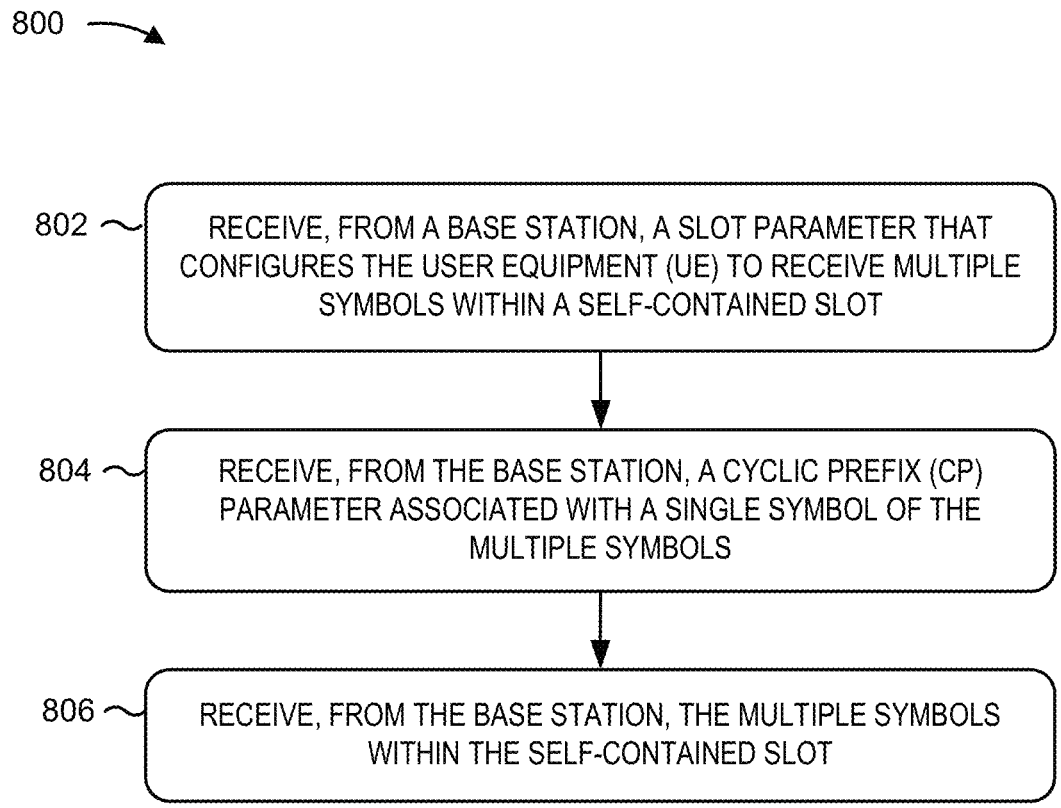
FIG. 8 is a flow diagram illustrating an example process performed, for example, by a UE, in accordance with various aspects of the present disclosure.

FIG. 8 is a flow diagram illustrating an example process 800 performed, for example, by a UE 120, in accordance with various aspects of the present disclosure. For example, operations of the process 800 may be performed by a communications manager 705 as described with reference to FIG. 7. In some examples, a UE may execute a set of instructions to control the functional elements of the UE to perform the operations or functions described below. Additionally, or alternatively, a UE may perform aspects of the operations or functions described below using special-purpose hardware.

As shown in FIG. 8, at block 802, the process 800 receives, from a base station, a slot parameter that configures the UE to receive a multiple symbols within a self-contained slot. At block 804, the process 800 receives, from the base station, a CP parameter associated with a single symbol of multiple symbols. The CP parameter may indicate a source of samples for a CP included at a beginning of the single symbol. At block 806, the process 800 receives, from the base station, the multiple symbols within the self-contained slot. In some examples, a GI may be included at one or both of an end or a beginning of each symbol of the multiple symbols, where each symbol of the multiple symbols may be associated with a respective FFT window of multiple FFT windows. A single FFT window, associated with the single symbol, may overlap an adjacent FFT window, associated with a symbol adjacent to the single symbol. Additionally, the CP may be outside the single FFT window.

Figure 9:
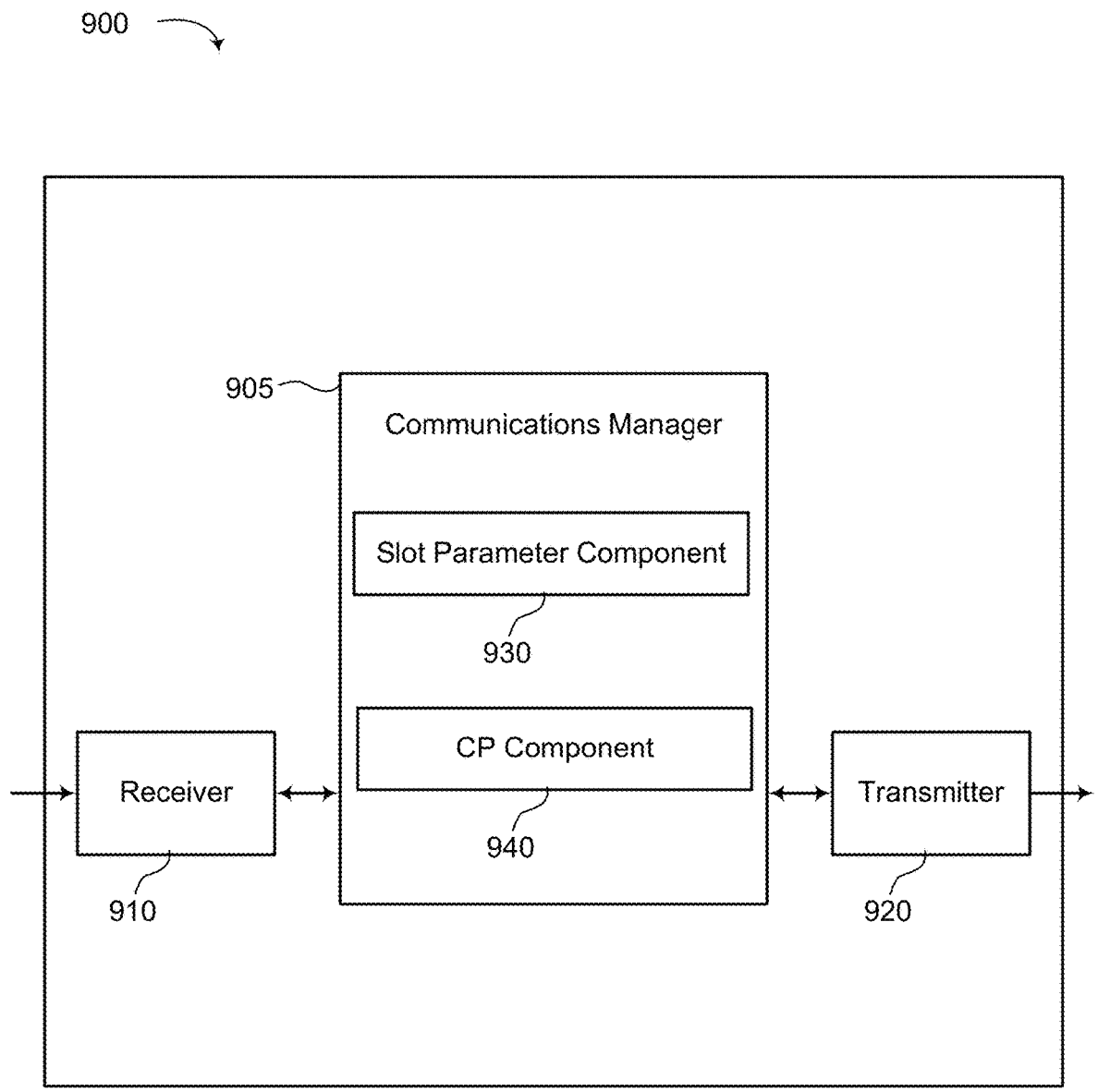
FIG. 9 is a block diagram illustrating an example of a wireless communication device that supports transmitting multiple symbols in a self-contained slot, in accordance with aspects of the present disclosure.

FIG. 9 is a block diagram of a wireless communication device 900 that coordinates inter-cell interference measurements, in accordance with aspects of the present disclosure. The wireless communication device 900 may be an example of aspects of a base station 110 described with reference to FIGS. 1 and 2. The wireless communication device 900 may include a receiver 910, a communications manager 915, and a transmitter 920, which may be in communication with one another (for example, via one or more buses). In some examples, the wireless communication device 900 is configured to perform operations, including operations of the process 1000 described below with reference to FIG. 10.

In some examples, the wireless communication device 900 can include a chip, system on chip (SoC), chipset, package, or device that includes at least one processor and at least one modem (for example, a 5G modem or other cellular modem). In some examples, the communications manager 915, or its sub-components, may be separate and distinct components. In some examples, at least some components of the communications manager 915 are implemented at least in part as software stored in a memory. For example, portions of one or more of the components of the communications manager 915 can be implemented as non-transitory code executable by the processor to perform the functions or operations of the respective component.

The receiver 910 may receive one or more reference signals (for example, periodically configured CSI-RSs, aperiodically configured CSI-RSs, or multi-beam-specific reference signals), synchronization signals (for example, synchronization signal blocks (SSBs)), control information, and/or data information, such as in the form of packets, from one or more other wireless communication devices via various channels including control channels (for example, a PDCCH) and data channels (for example, a PDSCH). The other wireless communication devices may include, but are not limited to, another base station 110 or a UE 120, described with reference to FIGS. 1 and 2.

The received information may be passed on to other components of the wireless communication device 900. The receiver 910 may be an example of aspects of the receive processor 238 described with reference to FIG. 2. The receiver 910 may include a set of radio frequency (RF) chains that are coupled with or otherwise utilize a set of antennas (for example, the set of antennas may be an example of aspects of the antennas 234a through 234t described with reference to FIG. 2).

The transmitter 920 may transmit signals generated by the communications manager 915 or other components of the wireless communication device 900. In some examples, the transmitter 920 may be collocated with the receiver 910 in a transceiver. The transmitter 920 may be an example of aspects of the transmit processor 220 described with reference to FIG. 2. The transmitter 920 may be coupled with or otherwise utilize a set of antennas (for example, the set of antennas may be an example of aspects of the antennas 234a through 234t), which may be antenna elements shared with the receiver 910. In some examples, the transmitter 920 is configured to transmit control information in a physical uplink control channel (PUCCH) and data in a physical uplink shared channel (PUSCH).

The communications manager 915 may be an example of aspects of the controller/processor 240 described with reference to FIG. 2. The communications manager 915 includes a slot parameter component 930 and a CP component 940. Working in conjunction with the transmitter 920, the slot parameter component 930 may transmit, to a UE, a slot parameter that configures the UE to receive multiple symbols within a self-contained slot. Additionally, working in conjunction with one or more of transmitter 920 or the slot parameter component 930, the CP component 940 may transmit, to the UE, a CP parameter associated with a single symbol of the multiple symbols. The CP parameter may indicate a source of samples for a CP included prior to a beginning of the single symbol. Furthermore, working in conjunction with one or more of transmitter 920 or the slot parameter component 930, the CP component 940 may transmit, to the UE, the multiple symbols within the self-contained slot. In some examples, a GI may be included at one or both of an end or a beginning of each symbol of the multiple symbols, where each symbol of the multiple symbols is with a respective FFT window of multiple FFT windows at the UE. Additionally, the CP may be included prior to a beginning of the single symbol, and the CP may be outside the FFT window associated with the single symbol.

Figure 10:
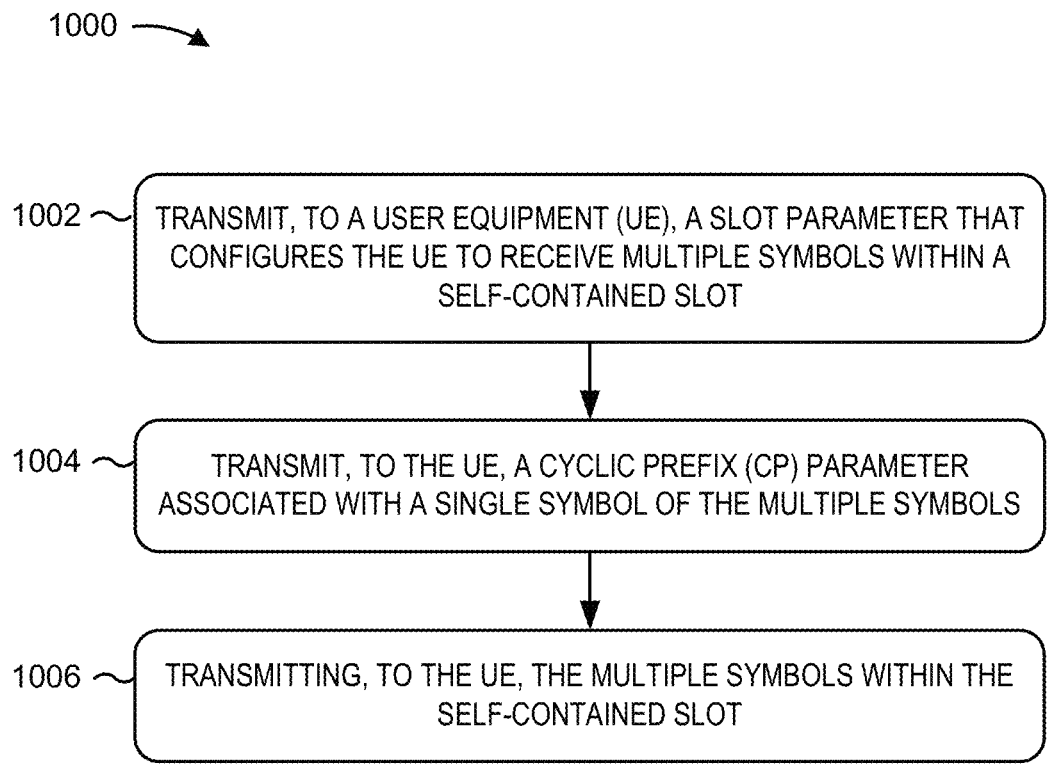
FIG. 10 is a flow diagram illustrating an example process performed, for example, by a base station, in accordance with various aspects of the present disclosure.

FIG. 10 is a flow diagram illustrating an example process 1000 performed, for example, by a base station 110, in accordance with various aspects of the present disclosure. For example, operations of the process 1000 may be performed by a communications manager 905 as described with reference to FIG. 9. In some examples, a base station may execute a set of instructions to control the functional elements of the base station to perform the operations or functions described below. Additionally, or alternatively, a base station may perform aspects of the operations or functions described below using special-purpose hardware.

As shown in FIG. 10, at block 1002, the process 1000 transmits, to a UE, a slot parameter that configures the UE to receive multiple symbols within a self-contained slot. At block 1004, the process 1000, transmits, to the UE, a CP parameter associated with a single symbol of the multiple symbols. The CP parameter may indicate a source of samples for a CP included prior to a beginning of the single symbol. Additionally, at block 1006, the process 1000 transmits, to the UE, the multiple symbols within the self-contained slot. In some examples, a GI may be included at one or both of an end or a beginning of each symbol of the multiple symbols, where each symbol of the multiple symbols is with a respective FFT window of multiple FFT windows at the UE. Additionally, the CP may be included prior to a beginning of the single symbol, and the CP may be outside the FFT window associated with the single symbol.

Implementation examples are described in the following numbered clauses.

Clause 1. A method for wireless communication performed by a UE, comprising: receiving, from a base station, a slot parameter that configures the UE to receive a plurality of symbols within a self-contained slot; receiving, from the base station, a CP parameter associated with a single symbol of the plurality of symbols, the CP parameter indicating a source of samples for a CP included at a beginning of the single symbol; and receiving, from the base station, the plurality of symbols within the self-contained slot, a GI being included at one or both of an end or a beginning of each symbol of the plurality of symbols, each symbol of the plurality of symbols being associated with a respective FFT window of a plurality of FFT windows, a single FFT window of the plurality of FFT windows, associated with the single symbol of the plurality of symbols, overlapping an adjacent FFT window of the plurality of FFT windows, the CP being outside the single FFT window.

Clause 2. The method of Clause 1, further comprising shifting the single FFT window based on a length of the CP, wherein the single FFT window overlaps the adjacent FFT window based on shifting the single FFT window.

Clause 3. The method of any one of Clauses 1-2, wherein: the source of samples is a symbol adjacent to the single symbol; the adjacent symbol is received after the single symbol; and the adjacent symbol is associated with the adjacent FFT window.

Clause 4. The method of Clause 3, wherein a length of the single symbol is less than a respective length of each other symbol of the plurality of symbols, the length of the single symbol excluding the CP.

Clause 5. The method of Clause 4, wherein: the single symbol includes first data and the adjacent symbol includes second data or a first reference signal; or the single symbol includes a second reference signal and the adjacent symbol includes a third reference signal.

Clause 6. The method of any one of Clauses 1-2, wherein the CP parameter further indicates an increase in a length of the single symbol and a decrease in a length of the adjacent symbol, such that the length of the adjacent symbol is less than a respective length of each other symbol of the plurality of symbols.

Clause 7. The method of Clause 6, wherein the single symbol includes a first reference signal and the adjacent symbol includes data or a second reference signal.

Clause 8. The method any one of Clauses 1-2, wherein: the source of samples is the single symbol; the samples are included at the beginning of a symbol adjacent to the single symbol; the adjacent symbol is received after the single symbol; and the adjacent symbol is associated with the adjacent FFT window.

Clause 9. The method of Clause 8, wherein: the single symbol includes a first reference signal and the adjacent symbol includes first data or a second reference signal; or the single symbol includes second data and the adjacent symbol includes third data.

Clause 10. The method any one of Clauses 1-9, wherein the CP parameter further indicates a location of the single symbol within the self-contained slot.

Clause 11. The method of any one of Clauses 1-10, further comprising receiving, from the base station, a message indicating a symbol allocation within the self-contained slot, and the method further comprises determining the single symbol based on the symbol allocation.

Clause 12. A method for wireless communication performed by a base station, comprising: transmitting, to a UE, a slot parameter that configures the UE to receive a plurality of symbols within a self-contained slot; transmitting, to the UE, a CP parameter associated with a single symbol of the plurality of symbols, the CP parameter indicating a source of samples for a CP included prior to a beginning of the single symbol; and transmitting, to the UE, the plurality of symbols within the self-contained slot, a guard interval (GI) being included at one or both of an end or a beginning of each symbol of the plurality of symbols, each symbol of the plurality of symbols being associated with a respective FFT window of a plurality of FFT windows at the UE, the CP included prior to a beginning of the single symbol, the CP being outside the FFT window associated with the single symbol.

Clause 13. The method of Clause 12, wherein: the source of samples is a symbol adjacent to the single symbol; and the adjacent symbol is transmitted after the single symbol.

Clause 14. The method of any one of Clauses 12-13, wherein a length of the single symbol is less than a respective length of each other symbol of the plurality of symbols, the length of the single symbol excluding the CP.

Clause 15. The method of Clause 14, wherein: the single symbol includes first data and the adjacent symbol includes second data or a first reference signal; or the single symbol includes a second reference signal and the adjacent symbol includes a third reference signal.

Clause 16. The method of any one of Clauses 12-13, further comprising: increasing a length of the single symbol and decreasing a length of the adjacent symbol; and adjusting a transmission window associated with the single symbol based on increasing the length, wherein the CP parameter further indicates the increased length of the single symbol and the decreased length of the adjacent symbol, such that the length of the adjacent symbol is less than a respective length of each other symbol of the plurality of symbols.

Clause 17. The method of Clause 16, wherein the single symbol includes a first reference signal and the adjacent symbol includes data or a second reference signal.

Clause 18. The method of Clause 12, wherein: the source of samples is the single symbol; the samples are included at the beginning of a symbol adjacent to the single symbol; and the adjacent symbol is transmitted after the single symbol.

Clause 19. The method of Clause 18, wherein: the single symbol includes a first reference signal and the adjacent symbol includes first data or a second reference signal; or the single symbol includes second data and the adjacent symbol includes third data.

Clause 20. The method of any one of Clauses 12-19, wherein the CP parameter further indicates a location of the single symbol within the self-contained slot.

Clause 21. The method of any one of Clauses 12-20, further comprising transmitting, to the UE, a message indicating a symbol allocation within the self-contained slot.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication performed by a user equipment (UE), comprising:
   receiving, from a base station, a slot parameter that configures the UE to receive a plurality of symbols within a self-contained slot;
   receiving, from the base station, a cyclic prefix (CP) parameter associated with a single symbol of the plurality of symbols, the CP parameter indicating an adjacent symbol to the single symbol is a first source of samples for a first CP included at a beginning of the single symbol or the single symbol is a second source of samples for a second CP included at a beginning of the adjacent symbol; and
   receiving, from the base station, the plurality of symbols within the self-contained slot, a guard interval (GI) being included at one or both of an end or a beginning of each symbol of the plurality of symbols, each symbol of the plurality of symbols being associated with a respective fast Fourier transform (FFT) window of a plurality of FFT windows, a single FFT window of the plurality of FFT windows, associated with the single symbol of the plurality of symbols, overlapping an adjacent FFT window of the plurality of FFT windows, the first CP being outside the single FFT window.

2. The method of claim 1, further comprising shifting the single FFT window based on a length of the first CP, wherein the single FFT window overlaps the adjacent FFT window based on shifting the single FFT window.

3. The method of claim 1, wherein:
   the adjacent symbol is received after the single symbol; and
   the adjacent symbol is associated with the adjacent FFT window.

4. The method of claim 3, wherein a length of the single symbol is less than a respective length of each other symbol of the plurality of symbols, the length of the single symbol excluding the first CP.

5. The method of claim 4, wherein:
   the single symbol includes first data and the adjacent symbol includes second data or a first reference signal; or
   the single symbol includes a second reference signal and the adjacent symbol includes a third reference signal.

6. The method of claim 1, wherein:
   the CP parameter further indicates an increase in a length of the single symbol and a decrease in a length of the adjacent symbol, such that the length of the adjacent symbol is less than a respective length of each other symbol of the plurality of symbols.

7. The method of claim 6, wherein the single symbol includes a first reference signal and the adjacent symbol includes data or a second reference signal.

8. The method of claim 1, wherein:
   the adjacent symbol is received after the single symbol; and
   the adjacent symbol is associated with the adjacent FFT window.

9. The method of claim 8, wherein:
   the single symbol includes a first reference signal and the adjacent symbol includes first data or a second reference signal; or the single symbol includes second data and the adjacent symbol includes third data.

10. The method of claim 1, wherein the CP parameter further indicates a location of the single symbol within the self-contained slot.

11. The method of claim 1, further comprising receiving, from the base station, a message indicating a symbol allocation within the self-contained slot, and the method further comprises determining the single symbol based on the symbol allocation.

12. An apparatus for wireless communications at a user equipment (UE), comprising:
one or more processors;
one or more memories coupled with the one or more processors; and
instructions stored in the one or more memories and operable, when executed by the one or more processors, to cause the apparatus to:
receive, from a base station, a slot parameter that configures the UE to receive a plurality of symbols within a self-contained slot;
receive, from the base station, a cyclic prefix (CP) parameter associated with a single symbol of the plurality of symbols, the CP parameter indicating an adjacent symbol to the single symbol is a first source of samples for a first CP included at a beginning of the single symbol or the single symbol is a second source of samples for a second CP included at a beginning of the adjacent symbol; and
receive, from the base station, the plurality of symbols within the self-contained slot, a guard interval (GI) being included at one or both of an end or a beginning of each symbol of the plurality of symbols, each symbol of the plurality of symbols being associated with a respective fast Fourier transform (FFT) window of a plurality of FFT windows, a single FFT window of the plurality of FFT windows, associated with the single symbol of the plurality of symbols, overlapping an adjacent FFT window of the plurality of FFT windows, the first CP being outside the single FFT window.

13. The apparatus of claim 12, wherein:
the adjacent symbol is received after the single symbol; and
the adjacent symbol is associated with the adjacent FFT window.

14. The apparatus of claim 13, wherein a length of the single symbol is less than a respective length of each other symbol of the plurality of symbols, the length of the single symbol excluding the first CP.

15. The apparatus of claim 12, wherein the CP parameter further indicates an increase in a length of the single symbol and a decrease in a length of the adjacent symbol, such that the length of the adjacent symbol is less than a respective length of each other symbol of the plurality of symbols.

16. The apparatus of claim 12, wherein:
the adjacent symbol is received after the single symbol; and
the adjacent symbol is associated with the adjacent FFT window.

17. A method for wireless communication performed by a base station, comprising:
transmitting, to a user equipment (UE), a slot parameter that configures the UE to receive a plurality of symbols within a self-contained slot;
transmitting, to the UE, a cyclic prefix (CP) parameter associated with a single symbol of the plurality of symbols, the CP parameter indicating an adjacent symbol to the single symbol is a first source of samples for a first CP included at a beginning of the single symbol or the single symbol is a second source of samples for a second CP included at a beginning of the adjacent symbol; and
transmitting, to the UE, the plurality of symbols within the self-contained slot, a guard interval (GI) being included at one or both of an end or a beginning of each symbol of the plurality of symbols, each symbol of the plurality of symbols being associated with a respective fast Fourier transform (FFT) window of a plurality of FFT windows at the UE, d the first CP being outside the FFT window associated with the single symbol.

18. The method of claim 17, wherein the adjacent symbol is transmitted after the single symbol.

19. The method of claim 18, wherein a length of the single symbol is less than a respective length of each other symbol of the plurality of symbols, the length of the single symbol excluding the first CP.

20. The method of claim 19, wherein:
the single symbol includes first data and the adjacent symbol includes second data or a first reference signal; or
the single symbol includes a second reference signal and the adjacent symbol includes a third reference signal.

21. The method of claim 17, further comprising:
increasing a length of the single symbol and decreasing a length of the adjacent symbol; and
adjusting a transmission window associated with the single symbol based on increasing the length, wherein the CP parameter further indicates the increased length of the single symbol and the decreased length of the adjacent symbol, such that the length of the adjacent symbol is less than a respective length of each other symbol of the plurality of symbols.

22. The method of claim 21, wherein the single symbol includes a first reference signal and the adjacent symbol includes data or a second reference signal.

23. The method of claim 17, wherein the adjacent symbol is transmitted after the single symbol.

24. The method of claim 23, wherein:
the single symbol includes a first reference signal and the adjacent symbol includes first data or a second reference signal; or
the single symbol includes second data and the adjacent symbol includes third data.

25. The method of claim 17, wherein the CP parameter further indicates a location of the single symbol within the self-contained slot.

26. The method of claim 17, further comprising transmitting, to the UE, a message indicating a symbol allocation within the self-contained slot.

27. An apparatus for wireless communications at a base station, comprising:
one or more processors;
one or more memories coupled with the one or more processors; and
instructions stored in the one or more memories and operable, when executed by the one or more processors, to cause the apparatus to:
transmit, to a user equipment (UE), a slot parameter that configures the UE to receive a plurality of symbols within a self-contained slot;
transmit, to the UE, a cyclic prefix (CP) parameter associated with a single symbol of the plurality of symbols, the CP parameter indicating an adjacent symbol to the single symbol is a first source of samples for a first CP included at a beginning of the single symbol or the single symbol is a second source of samples for a second CP included at a beginning of the adjacent symbol; and transmit, to the UE, the plurality of symbols within the self-contained slot, a guard interval (GI) being included at one or both of an end or a beginning of each symbol of the plurality of symbols, each symbol of the plurality of symbols being associated with a respective fast Fourier transform (FFT) window of a plurality of FFT windows at the UE, the first CP being outside the FFT window associated with the single symbol.

28. The apparatus of claim 27, wherein the adjacent symbol is transmitted after the single symbol.

29. The apparatus of claim 27, wherein execution of the instructions further cause the apparatus to:

increase a length of the single symbol and decreasing a length of the adjacent symbol; and adjust a transmission window associated with the single symbol based on increasing the length, wherein the CP parameter further indicates the increased length of the single symbol and the decreased length of the adjacent symbol, such that the length of the adjacent symbol is less than a respective length of each other symbol of the plurality of symbols.

30. The apparatus of claim 27, wherein the adjacent symbol is transmitted after the single symbol.

* * * * *